(12) United States Patent
Inoue et al.

(10) Patent No.: US 12,458,171 B2
(45) Date of Patent: Nov. 4, 2025

(54) FRYING OIL DETERIORATION ASSESSMENT DEVICE AND FRYING OIL DETERIORATION ASSESSMENT METHOD

(71) Applicant: J-OIL MILLS, Inc., Tokyo (JP)

(72) Inventors: Masami Inoue, Tokyo (JP); Ryohei Watanabe, Tokyo (JP); Kenichi Kakimoto, Tokyo (JP)

(73) Assignee: J-OIL MILLS, Inc., Tokyo (JP)

( * ) Notice: Subject to any disclaimer, the term of this patent is extended or adjusted under 35 U.S.C. 154(b) by 705 days.

(21) Appl. No.: 17/641,136

(22) PCT Filed: Aug. 6, 2020

(86) PCT No.: PCT/JP2020/030246
§ 371 (c)(1),
(2) Date: Mar. 8, 2022

(87) PCT Pub. No.: WO2021/053992
PCT Pub. Date: Mar. 25, 2021

(65) Prior Publication Data
US 2022/0322879 A1    Oct. 13, 2022

(30) Foreign Application Priority Data
Sep. 17, 2019   (JP) .................... 2019-168832

(51) Int. Cl.
*A47J 37/12* (2006.01)
*A23L 5/10* (2016.01)
*G01N 33/03* (2006.01)

(52) U.S. Cl.
CPC ............. *A47J 37/1266* (2013.01); *A23L 5/11* (2016.08); *G01N 33/03* (2013.01); *A23V 2002/00* (2013.01)

(58) Field of Classification Search
CPC ............. A47J 37/1228; A47J 37/1219; A47J 37/1266; A47J 37/1295; A47J 37/1276;
(Continued)

(56) References Cited

U.S. PATENT DOCUMENTS

| 6,745,669 B2 | 6/2004 | Suzuki |
| 7,885,521 B2 | 2/2011 | Feinberg et al. |

(Continued)

FOREIGN PATENT DOCUMENTS

| JP | 8-182624 A | 7/1996 |
| JP | 2000-63881 A | 2/2000 |

(Continued)

OTHER PUBLICATIONS

International Search Report (ISR) dated Oct. 27, 2020 filed in PCT/JP2020/030246.
(Continued)

*Primary Examiner* — Phuong T Nguyen
(74) *Attorney, Agent, or Firm* — RANKIN, HILL & CLARK LLP (57) ABSTRACT

A degree of deterioration of frying oil in a fryer can be assessed easily and accurately. A frying oil deterioration assessment device 41 comprises a recording unit 45 that records types of fried foods 19 fried in frying oil 17 in an electric fryer 14 and a fried quantity for each type, a holding unit 46 that holds correlation data indicating a relationship between the fried quantity for each type of fried food 19 and a degree of deterioration of the frying oil 17, and an assessment unit 47 that assesses the degree of deterioration of the frying oil 17 on the basis of the correlation data and the recorded types of fried food 19 and fried quantity of each type.

12 Claims, 10 Drawing Sheets

(58) Field of Classification Search
CPC ....... A47J 37/1271; A47J 537/12; A23L 5/11; A23V 2002/00; G01N 33/03
USPC .......... 99/330, 331, 403, 404, 409, 427, 419
See application file for complete search history.

(56) References Cited

U.S. PATENT DOCUMENTS

| | | | |
|---|---|---|---|
| 2008/0213445 | A1 | 9/2008 | Feinberg et al. |
| 2012/0301583 | A1 | 11/2012 | Nakada et al. |
| 2015/0230489 | A1 | 8/2015 | Sadakane et al. |
| 2016/0331179 | A1* | 11/2016 | Koether ............... A47J 37/1266 |
| 2019/0041375 | A1* | 2/2019 | Yamasaki ............... G01N 33/03 |

FOREIGN PATENT DOCUMENTS

| | | |
|---|---|---|
| JP | 2004-81431 A | 3/2004 |
| JP | 2009-25194 A | 2/2009 |
| JP | 2010-519982 A | 6/2010 |
| JP | 2011-205924 A | 10/2011 |
| JP | 2013-154227 A | 8/2013 |
| JP | 5457587 B1 | 4/2014 |
| JP | 5462985 B1 | 4/2014 |
| JP | 2015-107439 A | 6/2015 |
| JP | 2018-28459 A | 2/2018 |
| JP | 2019-100906 A | 6/2019 |
| WO | 2017/145944 A1 | 8/2017 |

OTHER PUBLICATIONS

Inoue et al., "Studies of Life span of frying oil : Flavor score of frying oil and the taste of fried foods coated with flour", Journal for the Integrated Study of Dietary Habits, 2010, vol. 20, No. 4, pp. 313-319 ; English abstract; Cited in ISR.

Japanese Written Opposition dated Aug. 6, 2021 for Japanese Patent No. 6829347.

Notice of Dispatch of Written Opposition issued on Sep. 9, 2021 for Japanese Patent No. 6829347; English machine translation.

Notice of Reasons for Revocation issued on Oct. 27, 2021 for Japanese Patent No. 6829347; English machine translation.

Notice of Reasons for Rejecting Request for Correction issued on Feb. 16, 2022 for Japanese Patent No. 6829347; English machine translation.

Mori et al., "Estimation of Chemical Properties and Color Changes of Frying Oil Used on a Large Scale", The Japanese Journal of Nutrition and Dietetics, 2011, vol. 69, Issue 2, pp. 82-89; Cited in Opposition; Partial English translation.

Tomioka et al., "Effect of Fish Phospholipids on the Deterioration of Frying Oil", Science of Cookery, 1973, vol. 6, Issue 22, pp. 118-124; Cited in Opposition; Partial English translation.

Kato, "Influence of Conditions of Fried Food Cooking on Deterioration of Frying Oil and Sensory Evaluation of Fried Foods" Journal for the Integrated Study of Dietary Habits, 2009, vol. 20, Issue 1, pp. 47-54; Cited in Opposition; Partial English translation.

Research group on Frying-cooking group, Kinki branch office, "Characteristics of frying Oil Reaching its Usable Life with a Flavor Score of 3", 2010, vol. 43, Issue 1, pp. 38-43; Cited in Opposition; Partial English translation.

Kitao et al., "Survey on the usage of Frying Oil in Home Life" Journal of Cookery Science of Japan, 1996, vol. 29, Issue 1, pp. 17-24; Cited in Opposition; Partial English translation.

Ota et al., Theory and practice of fried foods (revised edition), Saiwai Shobo, 1994; Cited in Opposition; Partial English translation.

Kajimoto, "Studies on the Character of Oil and its Smoking Point", Journal of Home Economics of Japan, 1961, vol. 12, Issue 4, pp. 309-311; Cited in Opposition; Partial English translation.

Yasuda, "Search for volatile decomposition products generated during frying From the lecture by Stephen S. Chang", Journal of Japan Oil Chemists' Society, 1967, vol. 16, Issue 12, pp. 681-689; Cited in Opposition; Partial English translation.

PCT International Preliminary Report on Patentability dated Oct. 27, 2020 filed in PCT/JP2020/030246; English translation.

* cited by examiner

FRYING OIL DETERIORATION ASSESSMENT DEVICE AND FRYING OIL DETERIORATION ASSESSMENT METHOD

TECHNICAL FIELD

The present invention relates to a device and method for assessing deterioration of frying oil.

In a shop that cooks and sells fried foods, frying oil in a fryer needs to be properly replaced. This is because as the fried quantity of fried foods fried in the fryer increases, the deterioration of the frying oil gradually progresses, and eventually a waste oil point (waste oil period or replacement period) is reached. The waste oil point is determined on the basis of the deterioration of the frying oil. Therefore, various methods for assessing deterioration of frying oil have been proposed.

In the method for assessing deterioration of frying oil in Patent Document 1, the deterioration of frying oil containing 20-100 mass % of oil and fat derived from soybeans is assessed by using 3-methyl-2,4-nonanedione as a deterioration indicator.

In the method for assessing deterioration of frying oil in Patent Document 2, a mark with a predetermined color different from the color of an inner surface of a body of an assessment container is placed in a position on the inner surface of the body at a predetermined height, frying oil to be assessed is poured into the container body, and the degree of deterioration of the frying oil is assessed from the height of the oil level of the frying oil when the color of the mark becomes indistinguishable.

PRIOR ART DOCUMENTS

Patent Documents

[Patent Document 1] Japanese Laid-Open Patent Application No. 2018-28459
[Patent Document 2] Japanese Laid-Open Patent Application No. 2009-25194

DISCLOSURE OF THE INVENTION

Problems the Invention is Intended to Solve

In the frying oil deterioration assessment method of Patent Document 1, the 3-methyl-2,4-nonanedione content must be analyzed, and the analysis work requires time and labor.

In the frying oil deterioration assessment method of Patent Document 2, deterioration according to color alone is assessed while there are a large number of indicators of deterioration in the frying oil. Depending on how the frying oil is used, another indicator of deterioration may have already reached the waste oil point even if the color has not reached the waste oil point. Therefore, it may not be possible to accurately determine the degree of deterioration of the frying oil.

An object of the present invention is to provide a frying oil deterioration assessment device and method that make it possible to assess the degree of deterioration of frying oil in a fryer easily and accurately.

Means for Solving the Aforementioned Problems

A frying oil deterioration assessment device of the present invention comprises:

a recording unit that records types of fried foods fried in frying oil in a fryer and fried quantities for each type;
a holding unit that holds correlation data indicating a relationship between fried quantity and degree of deterioration of frying oil for each type of fried food; and
an assessment unit that assesses the degree of deterioration, which is the extent of deterioration of the frying oil in the fryer, on the basis of the correlation data and the fried food types and fried quantities for each type recorded in the recording unit.

According to the present invention, correlation data indicating a relationship between fried quantity and degree of deterioration of frying oil is held for each type of fried food. Types of fried foods fried in frying oil in a fryer and fried quantities for each type are recorded, and the degree of deterioration of the frying oil is assessed on the basis of the correlation data and the fried food types and fried quantities for each recorded type of fried food. Therefore, the deterioration of the frying oil can be easily assessed without having to perform an analysis of the frying oil, and it is possible to accurately assess the degree of deterioration of the frying oil, which progresses according to the types of fried foods and the fried quantities for each type.

Preferably, in the frying oil deterioration assessment device of the present invention:
for each type of fried food, the correlation data includes deterioration-indicator-specific data indicating a relationship between a value of a deterioration indicator and the fried quantity with each of one, two, or more deterioration indicators of the frying oil; and
the assessment unit evaluates the value of the deterioration indicator pertaining to the frying oil in the fryer on the basis of the deterioration-indicator-specific data, and assesses the degree of deterioration of the frying oil on the basis of the evaluated value.

According to this configuration, one, two, or more deterioration indicators are evaluated in order to assess the degree of deterioration of the frying oil. The precision with which the degree of deterioration of the frying oil is assessed can thereby be increased.

Preferably, in the frying oil deterioration assessment device of the present invention,
the assessment unit assesses that the degree of deterioration of the frying oil is a predetermined degree of deterioration when the value of any one of the evaluated deterioration indicators of the frying oil in the fryer has exceeded a predetermined threshold value.

According to this configuration, the deterioration of the frying oil can be accurately assessed because the deterioration of the frying oil is assessed by being evaluated from a plurality of deterioration indicators. If any one of the plurality of deterioration indicators exceeds a predetermined threshold value, the degree of deterioration of the frying oil is assessed to be a predetermined degree of deterioration, whereby the quality of the frying oil for frying the fried foods can be kept at a certain standard.

Preferably, in the frying oil deterioration assessment device of the present invention,
the deterioration indicators include at least one of the following, for frying oil: acid value, viscosity, viscosity increase rate, color, anisidine value, polar compound amount, iodine value, oil temperature at the time of smoke emission, volatile component amount, volatile component composition, and flavor; and for the fried food fried in the frying oil: volatile component amount, volatile component composition, and flavor.

The acid value, viscosity, viscosity increase rate, or color of frying oil is also used as various indicators other than the deterioration indicator as a general analysis of the frying oil. Therefore, when these analysis parameters are adopted as deterioration indicators, the degree of deterioration of the frying oil can be assessed using relatively low-cost and highly reliable equipment.

When the anisidine value, polar compound amount, or iodine value of the frying oil is selected as a deterioration indicator, the value can be determined according to a reference oil and fat analysis test method. Therefore, when these analysis parameters are adopted as deterioration indicators, the degree of deterioration of the frying oil can be assessed with high precision.

When the oil temperature at the time of smoke emission is selected as a deterioration indicator, smoke emission can be observed from the outside and the oil temperature can be detected by a commonly used oil temperature sensor. Therefore, when the oil temperature at the time of smoke emission is adopted as a deterioration indicator, the degree of deterioration of the frying oil can be easily assessed at a relatively low cost.

The volatile component amount, volatile component composition, and flavor of the frying oil, and the volatile component amount and flavor of fried food fried in the frying oil are strongly related to the taste of the fried food, and preference of taste varies greatly from person to person. Therefore, when these analysis parameters are adopted as deterioration indicators, a degree of deterioration of the frying oil that strongly reflects the commitment of the cook can be assessed.

Preferably, the frying oil deterioration assessment device of the present invention
further comprises a determination unit that, on the basis of the degree of deterioration of the frying oil in the fryer assessed by the assessment unit, determines the types of fried foods allowed to be fried in the frying oil and the fried quantity for each type, and a discard amount and an add amount in a new oil addition process in which new oil is added into the fryer while discarding some of or not discarding any of the remaining frying oil in the fryer.

If the types of fried foods fried in the frying oil tend to be a particular type, the increase in the value of the deterioration indicator may become imbalanced among a plurality of deterioration indicators. According to this configuration, the determination unit determines the types of fried foods allowed to be fried in the frying oil and the fried quantity for each type, whereby the increase in the value of the deterioration indicator can be balanced among a plurality of deterioration indicators to prolong the life of the frying oil.

Furthermore, according to this configuration, the amount of remaining oil to discard and the amount of new oil to add are determined for the new oil addition process. By performing the new oil addition process, which is a process separate from the process of replacing all of the frying oil in the fryer, the amount of frying oil to replace can be reduced while suppressing the progress of the degree of deterioration of the frying oil.

Preferably, the frying oil deterioration assessment device of the present invention
further comprises a reporting unit that reports a result of the determination made by the determination unit and a timing to carry out the new oil addition process, said timing being based on said determination result.

According to this configuration, the result of the assessment made by the assessment unit and/or the result of the determination made by the determination unit can be reported with no delay.

Preferably, in the frying oil deterioration assessment device of the present invention, the recording unit recognizes and records the types of fried foods fried in the frying oil and the fried quantity for each type on the basis of at least one of the following: an image outputted from a camera that photographs the inside of the fryer, an operation performed on an operation unit of the fryer, a sales record of the fried foods fried in the frying oil, and a cooking work record of the cook.

According to this configuration, the types of fried foods fried in the frying oil and the fried quantity for each type can be detected without any impediment.

A frying oil deterioration assessment method of the present invention comprises:
a recording step in which a recording unit records types of fried foods fried in frying oil in a fryer and a fried quantity for each type; and
an assessment step in which an assessment unit assesses a degree of deterioration, which is an extent of deterioration of the frying oil in the fryer, on the basis of the recorded types of fried foods and the fried quantity of each type, and correlation data indicating a relationship between the fried quantity and the degree of deterioration of the frying oil for each type of fried food.

According to the present invention, the degree of deterioration can be assessed easily and accurately.

BEST MODE FOR CARRYING OUT THE INVENTION

A preferred embodiment of the present invention is described in detail below. Like reference symbols are used for elements and portions that are substantially the same or equivalent. In addition, reference symbols having the same numbers but different subscript letters are used for sets of elements having the same configuration (e.g., button switches $23a$, $23b$, . . . ). Furthermore, reference symbols with the subscript letters omitted are used when referring collectively to the elements in a set (e.g., button switches 23).

(Kitchen)

Figure 1:
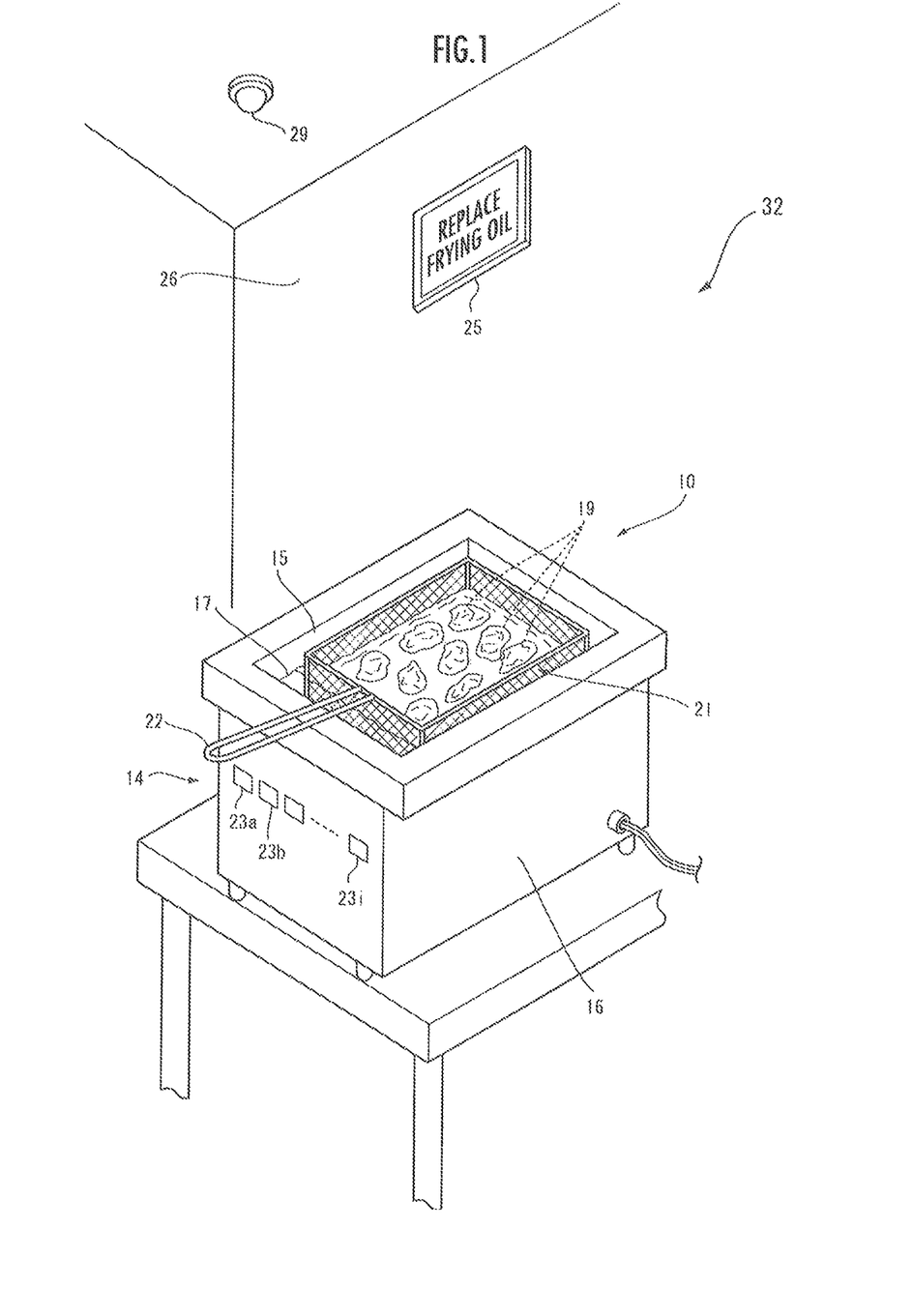
FIG. 1 shows a kitchen in which fried foods to be sold to customers are cooked.

FIG. 1 shows a kitchen 10 in which fried foods 19 to be sold to customers are cooked. The kitchen 10 is provided in a shop 32 such as a convenience store or a supermarket, and an electric fryer 14 is installed in the kitchen.

The electric fryer 14 has an oil tank 15 and a housing 16 that accommodates the oil tank 15. An upper side of the oil tank 15 is opened, and the oil tank 15 is provided in an upper part of the housing 16. Frying oil 17 is filled the oil tank 15 until reaching a predetermined height. The fried foods 19 are placed in a frying basket 21 that has a handle 22, and are then immersed in the frying oil 17, which is heated, in the oil tank 15.

The types of fried foods 19 (e.g., (fried) chicken, potatoes, and croquettes) that are placed together in the frying basket 21 and immersed together in the frying oil 17 are usually often the same. Specifically, the immersion time (frying time) in the frying oil 17 is different for each type of fried foods 19, and since the different kinds of fried foods 19 have different immersion times, it is difficult to fry different foods at the same time.

A plurality of button switches $23a$, $23b$, . . . , $23i$ are provided in an outer surface of the housing 16 according to the types of fried foods 19, and when a button switch corresponding to a fried food 19 is pressed, and an immersion time suited to the fried food 19 has elapsed, a buzzer is sounded for a fixed time from the electric fryer 14 and the frying basket 21 automatically rises from the oil tank 15. Alternatively, either a buzzer sound is outputted from a speaker (not shown) of the electric fryer 14 or a display 25 in a wall 26 displays that frying has ended.

A switch for adjusting the temperature of the frying oil 17 may be provided for each type of fried food 19. However, because the temperature of the frying oil 17 often does not change appreciably depending on the type of the fried food 19, it is sufficient if the temperature can be set to a specific temperature.

A camera 29 is hung from the ceiling or attached to the wall 26. The camera 29 may be either a video camera or a still camera, and the camera 29 captures the state in the oil tank 15 of the electric fryer 14 continuously or at regular time intervals. The type, number, etc., of fried foods 19 in the frying basket 21 can be detected from an output image of the camera 29.

When cooking is performed, first, a cook (not shown) in the kitchen 10 puts the fried food 19 into the frying basket 21, and then hangs the frying basket 21 on an upper end of a peripheral wall of the oil tank 15 so that the fried foods 19 in the frying basket 21 are immersed in the frying oil 17. The cook then, either at the same time as the immersion or before or after the immersion, presses one button switch 23 corresponding to the type of fried food 19 to be fried in the given instance.

The electric fryer 14 evaluates which button switch 23 has been operated by the cook, and when the frying time associated with the operated button switch 23 elapses, a buzzer is sounded for a fixed time from the electric fryer 14 and the frying basket 21 automatically rises from the oil tank 15, as previously described. Alternatively, either a buzzer sound is outputted from the speaker (not shown) of the electric fryer 14 or the display 25 on the wall 26 displays that frying has ended.

As a result, an employee becomes aware that frying has ended and pulls up the frying basket 21 to take out the fried food 19 from the oil tank 15. The frying basket 21 can be raised and lowered automatically by providing a drive mechanism.

(Network)

Figure 2:
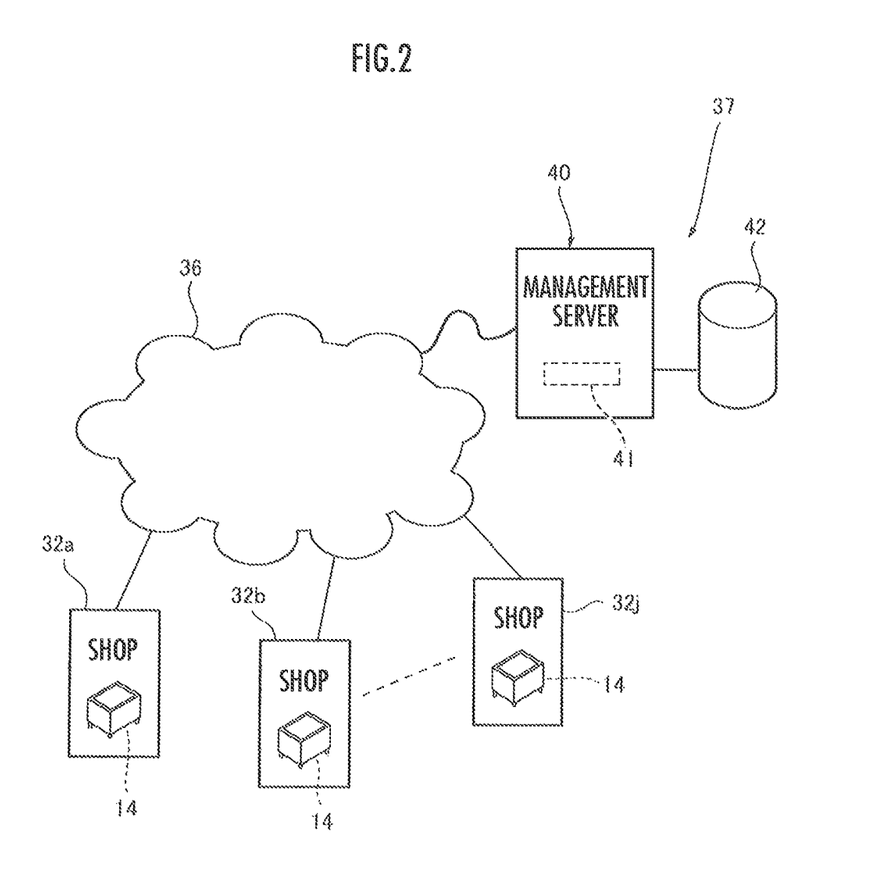
FIG. 2 is a schematic drawing of a network system in which a frying oil deterioration assessment device is incorporated.

FIG. 2 is a schematic drawing of a network system in which a frying oil deterioration assessment device 41 is incorporated. A headquarters 37 coordinates multiple shops $32a$, $32b$, . . . , $32j$ belonging to, for example, a convenience store chain or a supermarket chain, and a management server 40 is under the management of the headquarters 37.

The management server 40 communicates with information equipment and remote control units in the shops 32 via the Internet 36. The management server 40 implements the frying oil deterioration assessment device 41 and is connected to a database 42. The database 42 also serves as a storage device for the management server 40, and information other than that in the database can also be stored as appropriate.

The management server 40 also executes sales management (e.g., POS system), etc., as computer software other than the frying oil deterioration assessment device 41. The management server 40 has a well-known structure that includes all basic hardware (e.g., CPU, ROM, RAM, interface, etc.) resources utilized by a variety of computer software.

(Frying Oil Deterioration Assessment Device)

Figure 3:
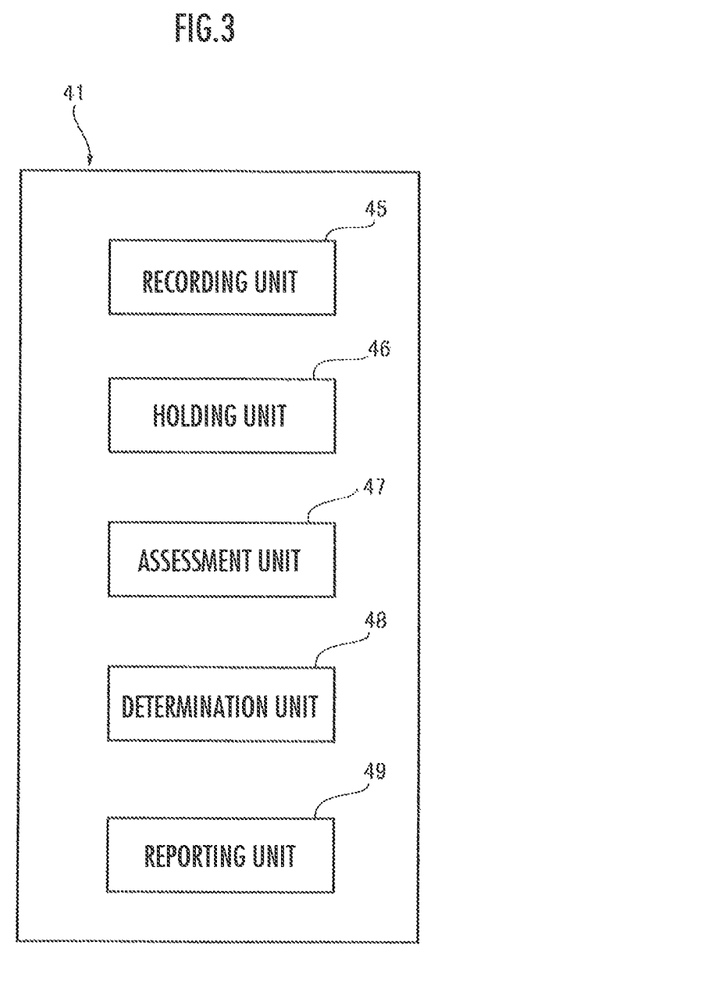
FIG. 3 is a function block diagram of a frying oil deterioration assessment device.

FIG. 3 is a function block diagram of the frying oil deterioration assessment device 41. The frying oil deterioration assessment device 41 includes a recording unit 45, a holding unit 46, an assessment unit 47, a determination unit 48, and a reporting unit 49. The details of the process executed by the frying oil deterioration assessment device 41 shall be described hereinafter with reference to FIG. 8.

(Deterioration Indicators)

Figure 4A:
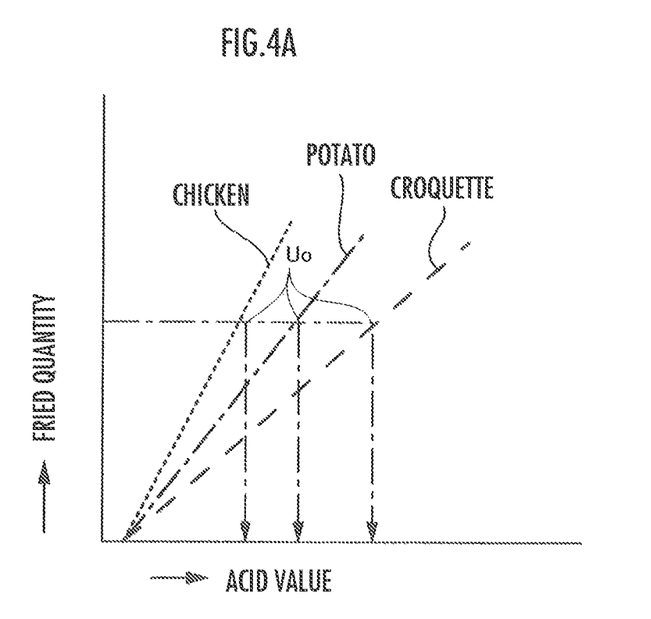
FIG. 4A is a graph schematically showing an example of deterioration characteristics for the acid value of frying oil.
Figure 4B:
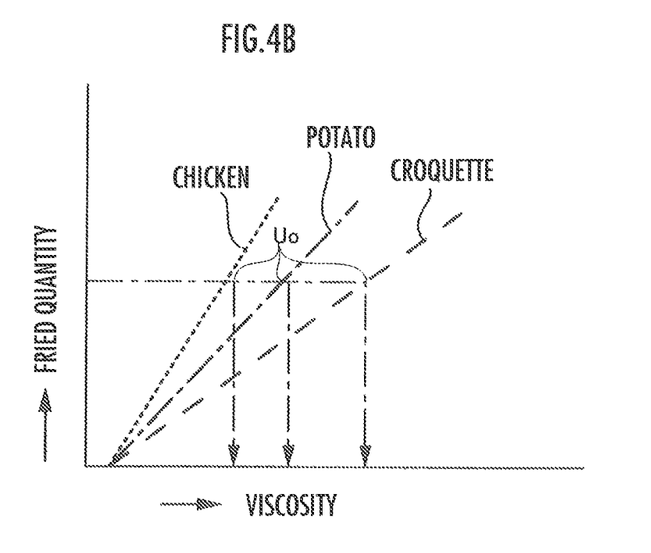
FIG. 4B is a graph schematically showing an example of deterioration characteristics for the viscosity of frying oil.
Figure 4C:
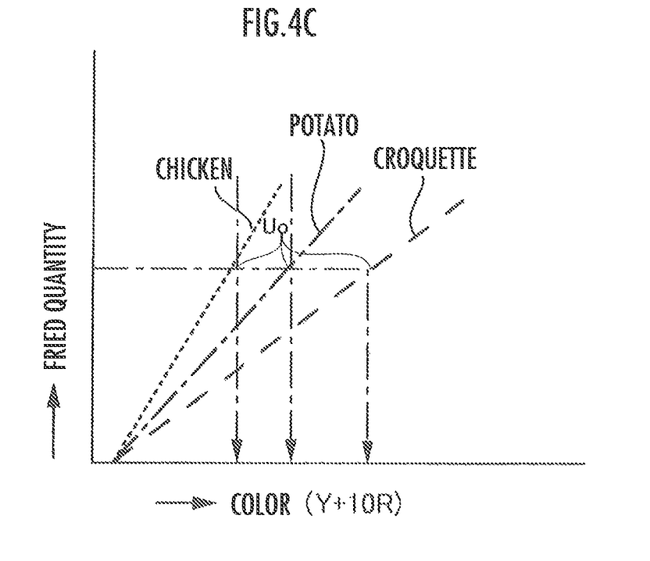
FIG. 4C is a graph schematically showing an example of deterioration characteristics for the color of frying oil.

FIGS. 4A-4C are each a graph schematically showing an example of a deterioration indicator used to assess the deterioration of frying oil. In FIGS. 4A-4C, the vertical axis represents the fried quantity of fried foods 19, and the horizontal axes of the different graphs respectively represent acid value, viscosity, and color value as deterioration indicators of the frying oil 17.

In FIGS. 4A-4C, Uo indicates coordinates corresponding to times when frying oil 17 in the oil tank 15 is changed from old oil to new oil and the frying oil 17 begins to be used again after being replaced in the oil tank 15.

For color, FIG. 4C schematically shows Y+10R in which colors of the frying oil 17 are measured according to Standard method for the analysis of fats, oils, and related materials no. 2.2.1.1-2013.

For acid value, FIG. 4A schematically shows values in which acid values of the frying oil 17 are measured according to Standard method for the analysis of fats, oils, and related materials no. 2.3.1-2013. When the acid value of the frying oil 17 exceeds 2.5, the frying oil 17 of the oil tank 15 is discarded and replaced with new frying oil 17.

For viscosity, FIG. 4B schematically shows values of the frying oil 17 in which viscosities of the frying oil 17 are measured with a commercially available viscometer, e.g., an E-type viscometer (TVE-25H, made by Toki Sangyo Co., Ltd.).

Viscosity increase rate can also be selected as a deterioration indicator of the frying oil 17. As a general definition of the viscosity increase rate, old frying oil 17 of the oil tank 15 is replaced with new oil, and the measured value of viscosity before the fried food 19 is fried for the first time in the frying oil 17 after the replacement (the viscosity at the start of use) is designated as Vs. As the fried food 19 is then repeatedly fried using the frying oil 17, the deterioration of the frying oil 17 progresses and the viscosity of the frying oil 17 increases. The measured value at the time of viscosity measurement after the start of use is designated as Vt. The viscosity increase rate is defined as the ratio of the amount of increase in viscosity to Vs (=Vt−Vs).

The anisidine value can be measured by a reference oil and fat analysis method 2.5.3-2013.

The amount of polar compound can be measured by a reference oil and fat analysis method 2.5.5-2013, and a commercially available polar component measurement device (such as one made by Testo Corp.) based on this method.

In FIGS. 4A-4C, three examples of the types of fried food 19 are selected: chicken (dotted line), potato (single-dashed line), and croquette (broken line). It may be more convenient to weigh the fried amount of chicken or potatoes by fried weight rather than by the fried quantity, but in FIGS. 4A-4C, when weighed by fried weight, the amount is converted to a fried quantity corresponding to the fried weight.

From FIGS. 4A-4C, it can be seen that even if the same number of fried foods 19 are fried in frying oil 17, the amount of increase in the value of the deterioration indicator is different.

The characteristic data for each type of fried food 19 in FIGS. 4A-4C is held in the database 42 by the holding unit 46 as correlation data for each deterioration indicator showing the relationship between the fried quantity and the degree of deterioration of frying oil for each type of fried food 19. The assessment unit 47 refers to the correlation data for each deterioration indicator to evaluate the value of the deterioration indicator for each deterioration indicator, and assesses the overall degree of deterioration of the frying oil 17 on the basis of the evaluated value.

Figure 5:
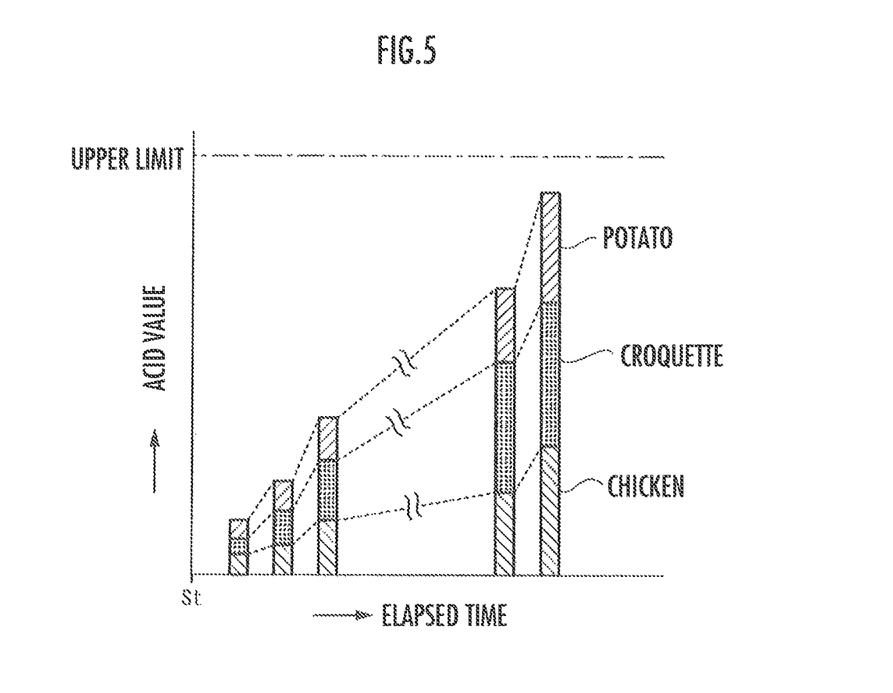
FIG. 5 is a graph showing that the acid value increases along with the increase in the number of times fried food is fried from the start of frying oil use.

FIG. 5 is a graph showing that the acid value, which is one of the deterioration indicators, increases along with the increase in the number of times the fried food 19 is fried from the start of the use of the frying oil 17 (from Uo in FIG. 4A). In FIG. 5, the horizontal axis represents the time elapsed from the time at which the frying oil 17 starts to be used St.

In FIG. 5, the acid value is shown by the height of the bars at regular time intervals during the use of the frying oil 17. Each bar shows a type of fried food 19 that has contributed to the acid value at each time point. Because the type of the best-selling fried food 19 may change depending on the time, the ratio of the type of the fried food 19 in the bar at each time point is different for each elapsed time.

As is clear from FIG. 5, in general, after the frying oil 17 in the oil tank 15 is replaced with new frying oil 17, the frying oil 17 deteriorates as the fried quantity of the fried food 19 increases. Therefore, for example, when the frying oil 17 reaches the upper limit of the acid value, it is time to replace the frying oil 17.

An example of a technique for determining the replacement time (waste oil point) of the frying oil 17 shall now be described. In this technique, first, a regression equation for calculating the value of the deterioration indicator is set. The following equation (1) is a regression equation for calculating the value of an acid value P. In actual application, the regression equation is set for each deterioration indicator other than acid value, such as viscosity, and the value calculated for each deterioration indicator is evaluated.

$$P = a \cdot X + b \cdot Y + c \cdot Z + d \qquad \text{Equation (1):}$$

In equation (1), the variables X, Y, and Z are the fried quantities of chicken, potato, and croquette, respectively. The variables a, b, and c are the increased acid values per frying of chicken, potato, and croquette, respectively. The variable d is a correction amount. The values of a-d are determined with testing. The values a-d are not applied to the electric fryers 14 of all the shops 32, and can be, inter alia, set for each area where an electric fryer 14 is present, or changed according to the season.

The regression equation of equation (1) is shown as one example of a simple regression equation. The regression equation for calculating the value of a deterioration indicator such as acid value need not be the simple regression equation of equation (1); depending on the situation of the application, a multiple regression equation in which all or some of the variables X, Y, and Z in the regression equation are two-dimensional can also be applied as appropriate.

Figure 6:
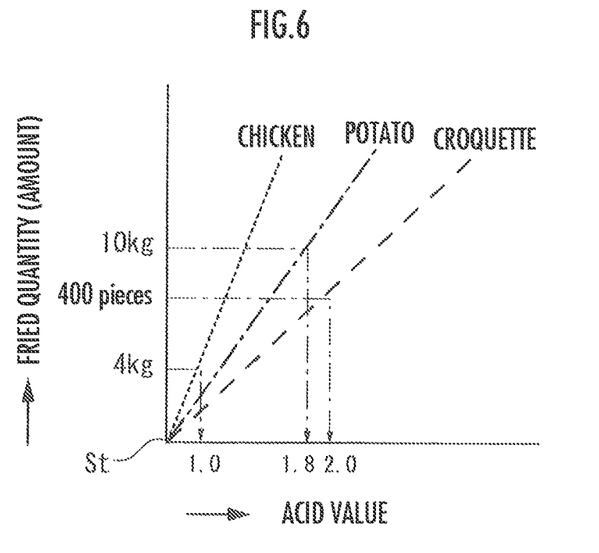
FIG. 6 is an explanatory graph in which a regression equation is applied to determine a waste oil point (frying oil replacement period)

FIG. 6 is an explanatory graph in which the regression equation of equation (1) is applied to determine a waste oil point (period for replacing frying oil 17). At a certain point in time after the frying oil 17 begins to be used, the fried quantity for each type of fried food 19 is 4 kg for chicken, 10 kg for potatoes, and 400 pieces for croquettes. The values for acid value corresponding to these fried quantities are 1.0 (a=0.25/kg) for chicken, 1.8 (b=0.18/kg) for potatoes, and 2.0 (c=0.005/piece) for croquettes. This being the case, when the initial acid value of the frying oil 17, i.e., d is 0 and 2 kg of chicken, 10 kg of potatoes, and 40 croquettes are fried, these values are substituted in equation (1) of the regression equation, whereupon P=2.5. In this case, P=2.5 is set as the waste oil point of the frying oil 17.

Figure 7:
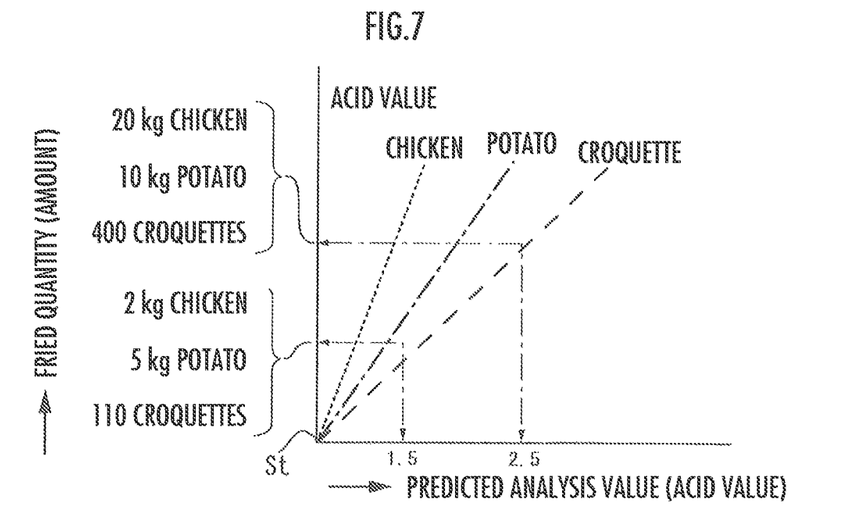
FIG. 7 is an explanatory graph of when a regression equation is applied to determine the quantity that can be fried before discarding the frying oil for each type of fried food.

FIG. 7 is an explanatory graph of when a regression equation is applied to determine the quantity that can be fried before discarding the frying oil 17 for each type of fried food 19.

The following description involves a case in which the waste oil point of the frying oil 17 is set to 2.5. The fried quantities (amounts) of chicken, potatoes, and croquettes when P=2.5 are known. The known fried quantities (amounts) are assumed to be, for example, 20 kg for chicken (a=0.025/kg), 10 kg for potatoes (b=0.18/kg), and 400 pieces for croquettes (c=0.005/kg). It is assumed that the predicted acid value at a certain point in time is 1.5, and 2 kg of chicken, 5 kg of potatoes, and 100 croquettes have been fried. In this case, subtracting the respective fried quantities from the aforementioned known quantities (20 kg of chicken, 10 kg of potatoes, and 400 croquettes), it is apparent that the fried quantities that are possible until the waste oil point is reached using the same frying oil 17 are 18 kg of chicken, 5 kg of potatoes, and 290 croquettes).

(Other Deterioration Indicators)

Other deterioration indicators for the frying oil 17 in the electric fryer 14 further include the iodine value, the oil temperature at the time of smoke emission, the volatile component content, and the volatile component composition of the frying oil 17. Furthermore, the flavor of the fried food 19 fried in the frying oil 17 of the electric fryer 14 can also be used as a deterioration indicator. When a deterioration indicator is actually measured, at least one of these deterioration indicators is selected. The other deterioration indicators shall be described in detail below.

Iodine value as a deterioration indicator can be measured according to a Standard method for the analysis of fats, oils, and related materials no. 2.3.4.1-1996. The iodine value is a numerical value indicating the magnitude of the number of double bonds, and since it is predicted that oxygen bonds to the double bonds due to the oxidation of the oil and fat, the iodine value presumably changes.

Oil temperature at the time of smoke emission from the frying oil 17 of the oil tank 15 can be selected as a deterioration indicator. The normal oil temperature when fried food 19 is being fried is 170-190° C., and smoke is not emitted at this oil temperature. However, as the deterioration of the frying oil 17 progresses, the oil temperature at the time of smoke emission decreases, and smoke will be emitted even at this oil temperature. Smoke emission from the frying oil 17 of the oil tank 15 can be monitored by the camera 29, but a dedicated monitoring camera can also be separately deployed in the vicinity of the oil tank 15. When the oil temperature at the time of smoke emission is less than 170° C., all of the frying oil 17 of the oil tank 15 is discarded and replaced with new frying oil 17.

A volatile component from the frying oil 17 itself or from the fried food 19 fried in the frying oil 17 is a component (odor component) that volatilizes from the fried food or the frying oil, and the amount and composition of the component changes due to the deterioration of the frying oil. This volatile component can be measured using a gas chromatograph-mass spectrometer (GC-MS), an odor sensor, or the like.

The flavor of the fried food 19 fried in the frying oil 17 can be measured by organoleptic evaluation (a method in which a person actually eats and evaluates the food), a taste sensor, or the like. As the deterioration of the frying oil 17 progresses, the deliciousness of the fried food 19 fried using the deteriorated frying oil 17 naturally decreases. Thus, the deterioration indicators of the frying oil can include not only chemical deterioration indicators but also a deterioration indicator from the viewpoint of deliciousness.

Furthermore, the carbonyl value of the frying oil 17 can also be selected as a deterioration indicator of the frying oil 17. When the frying oil 17 oxidizes, first, a peroxide is produced. The peroxide then decomposes and produces a carbonyl-group-containing secondary product. Therefore, the degree of deterioration of the frying oil 17 can be analyzed from the carbonyl value of the frying oil 17. When the carbonyl value exceeds 50, all the frying oil 17 of the oil tank 15 is discarded and replaced with new frying oil 17.

(Advantages of the Individual Deterioration Indicators)

The acid value, viscosity, viscosity increase rate, or color of the frying oil 17 is also used as various indicators other than the deterioration indicator as a general analysis of the frying oil 17. Therefore, when these analysis parameters are adopted as deterioration indicators, the degree of deterioration of the frying oil 17 can be assessed using a relatively low-cost and highly reliable device.

When the anisidine value, amount of polar compound, or iodine value of the frying oil 17 is selected as the deterioration indicator, the value can be determined according to a standard method for the analysis of fats, oils, and related materials. Therefore, when these analysis parameters are adopted as deterioration indicators, the degree of deterioration of the frying oil 17 can be assessed with high precision.

When the oil temperature at the time of smoke emission is selected as the deterioration indicator, the smoke emission can be observed from the outside, and the oil temperature can also be detected by a commonly used temperature sensor. Therefore, when the oil temperature at the time of smoke emission is adopted as the deterioration indicator, the degree of deterioration of the frying oil 17 can be easily assessed at a relatively low cost.

The volatile component amount, volatile component composition, and flavor of the frying oil 17, and the volatile component amount, volatile component composition, and flavor of fried food fried in the frying oil 17 are strongly related to the taste of the fried food, and preference of taste varies greatly from person to person. Therefore, when these analysis parameters are adopted as deterioration indicators, a degree of deterioration of the frying oil 17 that strongly reflects the commitment of the cook can be assessed.

(Deterioration Assessment Method)

Figure 8:
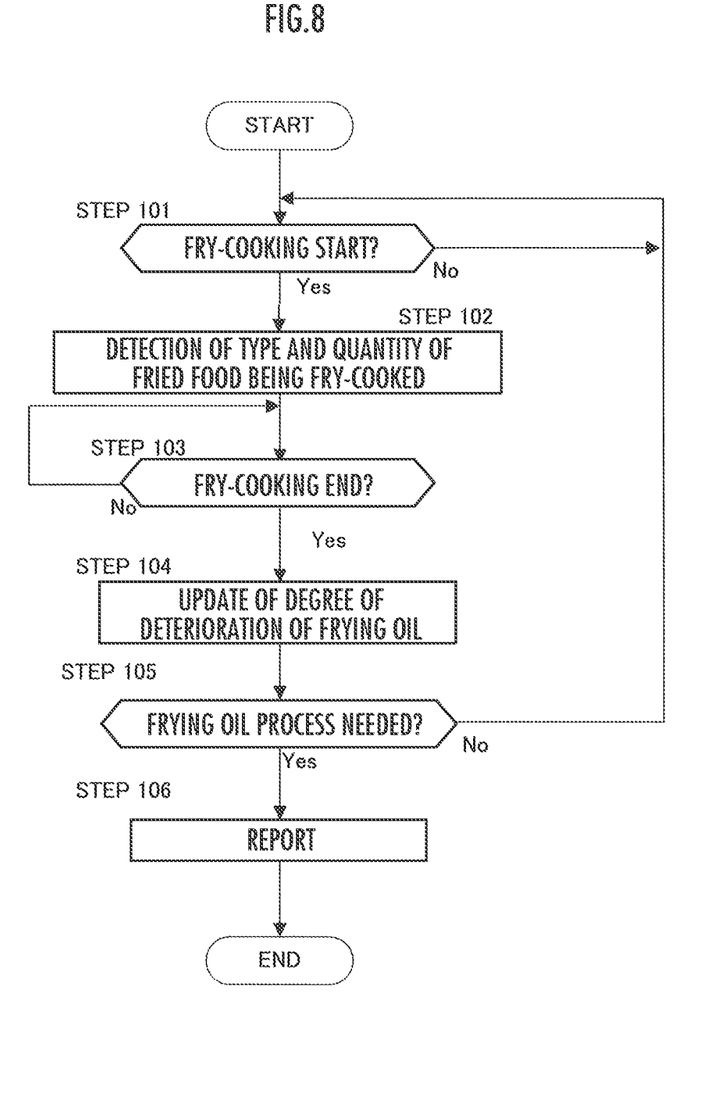
FIG. 8 is a flowchart of a frying oil deterioration assessment method.

Next, with reference to FIG. 8, a description shall be given of the frying oil deterioration assessment method executed by the frying oil deterioration assessment device 41 in order to determine the replacement period of the frying oil 17. FIG. 8 is a flowchart of the frying oil deterioration assessment method.

In STEP 101, the recording unit 45 assesses whether or not fry-cooking of fried food 19 in the electric fryer 14 has begun. The recording unit 45 can assess whether or not fry-cooking of the fried food 19 has begun on the basis of an image of the camera 29 or the operation of the button switches 23 by the cook.

When the assessment of STEP 101 is negative, the recording unit 45 executes the process of STEP 101 again after a fixed time.

The recording unit 45 advances the process to STEP 102 as soon as the assessment of STEP 101 becomes positive.

In STEP 102, the recording unit 45 detects the type and quantity of fried food 19 being fry-cooked in the electric fryer 14. The type and quantity of fried food 19 being fry-cooked in the electric fryer 14 can be detected, for example, from the image of the camera 29.

In addition, the type and quantity of fried food 19 fry-cooked in the electric fryer 14 can also be detected by detecting which button switch 23 of the electric fryer 14 is operated by the cook. This is because, usually, in one fry-cooking, the fried food 19 in the frying basket 21 always contains an equal quantity of fried food 19 of the same type (e.g., chicken, potato, or croquettes).

When the amount of the contents of the frying basket 21 is measured not by quantity but by weight, the recording unit 45 can convert the measured weight to quantity and record the quantity as a fried quantity.

In STEP 103, the recording unit 45 determines whether or not the fry-cooking of fried food 19 in the electric fryer 14 has ended. Whether or not the fry-cooking of fried food 19 in the electric fryer 14 has ended can be assessed on the basis of the image of the camera 29.

When the fry-cooking of fried food 19 in the electric fryer 14 has ended, a buzzer is sounded from the electric fryer 14 for a fixed time, and the frying basket 21 automatically rises from the oil tank 15. Alternatively, the buzzer may be sounded until the cook removes the handle 22 from the oil tank 15. Therefore, the recording unit 45 can detect the end of fry-cooking the fried food 19 in the electric fryer 14 from the buzzer sound.

The recording unit 45 updates the recorded number (fried quantity of the fried food 19) in the database 42, which serves as a storage device, before the process is transitioned from STEP 102 to STEP 103. Specifically, the recorded number recorded in the database 42 for the type of fried food 19 detected in STEP 102 is updated to an addition value obtained by adding the quantity of fried food 19 detected in STEP 102 to the value before the update.

When the assessment of STEP 103 is negative, the recording unit 45 executes the process of STEP 103 again after a fixed time.

The recording unit 45 advances the process to STEP 104 as soon as the assessment of STEP 103 becomes positive.

In STEP 104, the assessment unit 47 updates the degree of deterioration, which is the extent of the deterioration of the frying oil 17. The degree of deterioration of the frying oil 17 is set to an initial value corresponding to the degree of deterioration when there is no deterioration at the start of use each time the frying oil 17 in the oil tank 15 is replaced with new frying oil 17. The degree of deterioration of the initial value is set in response to a predetermined interrupt signal.

In STEP 105, the determination unit 48 assesses whether or not the frying oil 17 of the electric fryer 14 needs to be processed by a person in charge of cooking. Processing the frying oil 17 includes a total oil replacement process in which the frying oil 17 of the electric fryer 14 is completely replaced with new frying oil 17, and a new oil addition process.

The determination unit 48 judges whether to carry out the total oil replacement process or the new oil addition process, and how much oil to discard and add when carrying out the new oil addition process, on the basis of various conditions (e.g., the future predicted sales quantity of each type of fried food 19 predicted from a variety of data, the present degree of deterioration of the frying oil 17, and the degree of progress of the degree of deterioration).

Figure 9:
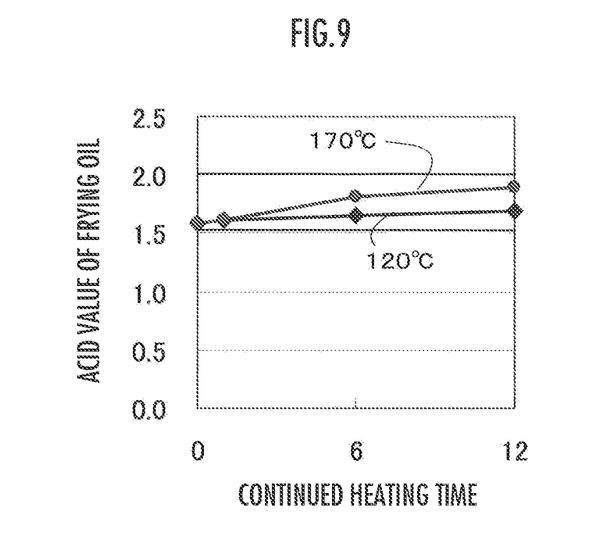
FIG. 9 is a graph of the relationship between the time over which the frying oil continues to be heated and the acid value of the frying oil 17.

The new oil addition process shall be described hereinafter using the drawings from FIG. 9 onward. The total oil replacement process shall now be described. When determining the total oil replacement process of the frying oil 17, the determination unit 48 makes an assessment on the basis of whether or not the frying oil 17 of the electric fryer 14 is in the waste oil period (waste oil point).

Specifically, for example, the determination unit 48 can determine the waste oil period from the degree of deterioration of the frying oil 17 assessed according to the deterioration indicator by the assessment unit 47 with reference to the deterioration indicator-specific data of FIGS. 4A-4C. In this case, the determination unit 48 determines that the waste oil point has been reached when the assessment unit 47 evaluates that even one of the multiple set deterioration indicators has reached an upper limit of deterioration.

For example, the time at which the acid value P calculated by the assessment unit 47 using equation (1) reaches the waste oil point can be determined by the determination unit 48 to be the waste oil period.

When the assessment of STEP 105 is positive, the determination unit 48 advances the process to STEP 106. When the assessment is negative, the process is returned to STEP 101.

In STEP 106, the reporting unit 49 issues various reports. The various reports include, for example, the result of the assessment made by the assessment unit 47, the result of the determination made by the determination unit 48, and the timing at which the new oil addition process is carried out on the basis of the determination result. Specific reporting methods include displaying the report on the display 25 (FIG. 1), and outputting a voice or a buzzer sound using a speaker built into the display 25.

The process of the frying oil deterioration assessment method of FIG. 8 ends as soon as STEP 106 ends. The specific content of the report issued by the reporting unit 49 shall be described after the next new oil addition process is explained.

(New Oil Addition Process)

The new oil addition process relating to STEP 106 and 107 shall be described. The total oil replacement process replaces all of the frying oil 17 of the electric fryer 14 with new frying oil 17, whereas the new oil addition process is a process of adding new frying oil 17 to the electric fryer 14 while leaving the old frying oil 17 of the electric fryer 14 (referred to below as "adding oil" as appropriate).

The term "adding oil" means that instead of replacing all of the frying oil 17 of the oil tank 15 with new frying oil 17, new frying oil 17 is added to the oil tank 15 in an amount Wn while old frying oil 17 is left in the oil tank 15. When new frying oil 17 is added to the oil tank 15 in the amount Wn, the old frying oil 17 is discarded from the oil tank 15 in an amount Wo. Normally, the amount Wo equal to the amount Wn and the amount Wo is greater than 0(Wo=Wn and Wo>0), but adding oil also includes cases of the amount Wo being less than the amount Wn or the amount Wo being equal to 0(Wo<Wn or Wo=0).

The significance of adding oil shall be described with reference to FIGS. 9-12. FIG. 9 is a graph of the relationship between the time over which the frying oil 17 continues to be heated and the acid value of the frying oil 17. This graph shows how the acid value of the frying oil 17 changes in relation to the continued heating time (0-12 hours) while the frying oil 17 is kept at an equal temperature. It can be seen that when the heating temperature is 120° C., the acid value does not change even if the continued heating time increases, whereas when the heating temperature is 170° C., the acid value increases as the continued heating time increases.

Figure 10:
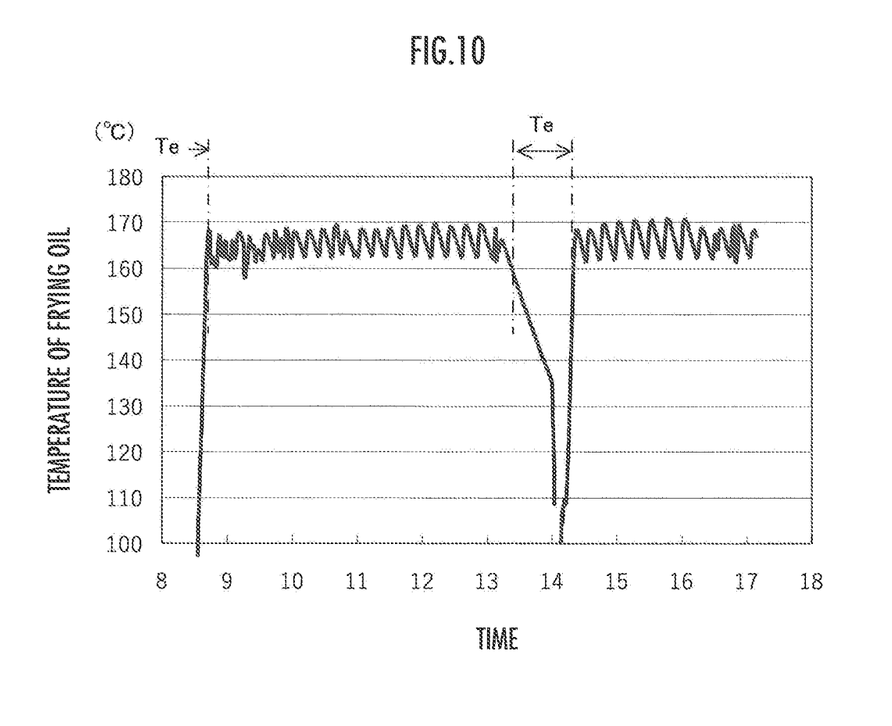
FIG. 10 shows the general relationship between the time during business hours of the shop and the temperature of the frying oil in the oil tank of the fryer.

The fried food 19 is typically cooked in the electric fryer 14 with the frying oil 17 in the oil tank 15 kept at 170° C. FIG. 10 shows the general relationship between the time during business hours of the shop 32 and the temperature of the frying oil 17 in the oil tank 15 of the electric fryer 14. The fried food 19 is not constantly being cooked in the electric fryer 14 during the business hours of the shop 32, but intermittently. During the period when the fried food 19 is being cooked in the electric fryer 14, the temperature of the frying oil 17 in the oil tank 15 is judged to be 160° C. or higher. Therefore, the period in which the temperature of the frying oil 17 in the oil tank 15 is less than 160° C. is excluded from the cumulative time in FIG. 11 below as an exclusion period Te.

Figure 11:
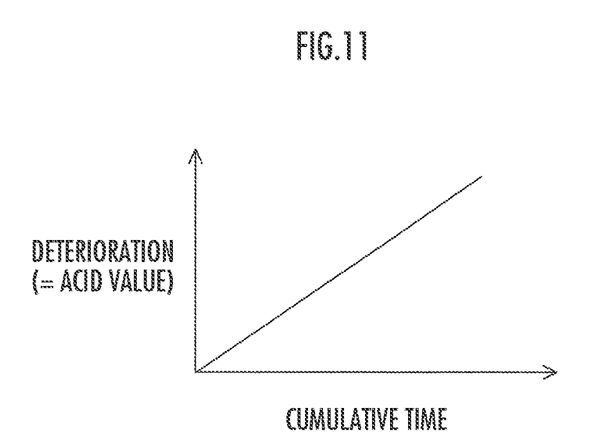
FIG. 11 is a graph of the relationship between deterioration (particularly acid value) and the cumulative time during which the frying oil is at 160° C. or higher.

FIG. 11 is a graph of the relationship between deterioration (particularly acid value) and the cumulative time during which the frying oil 17 is at 160° C. or higher. It can be seen that the acid value and the cumulative time are in a proportional relationship.

Figure 12:
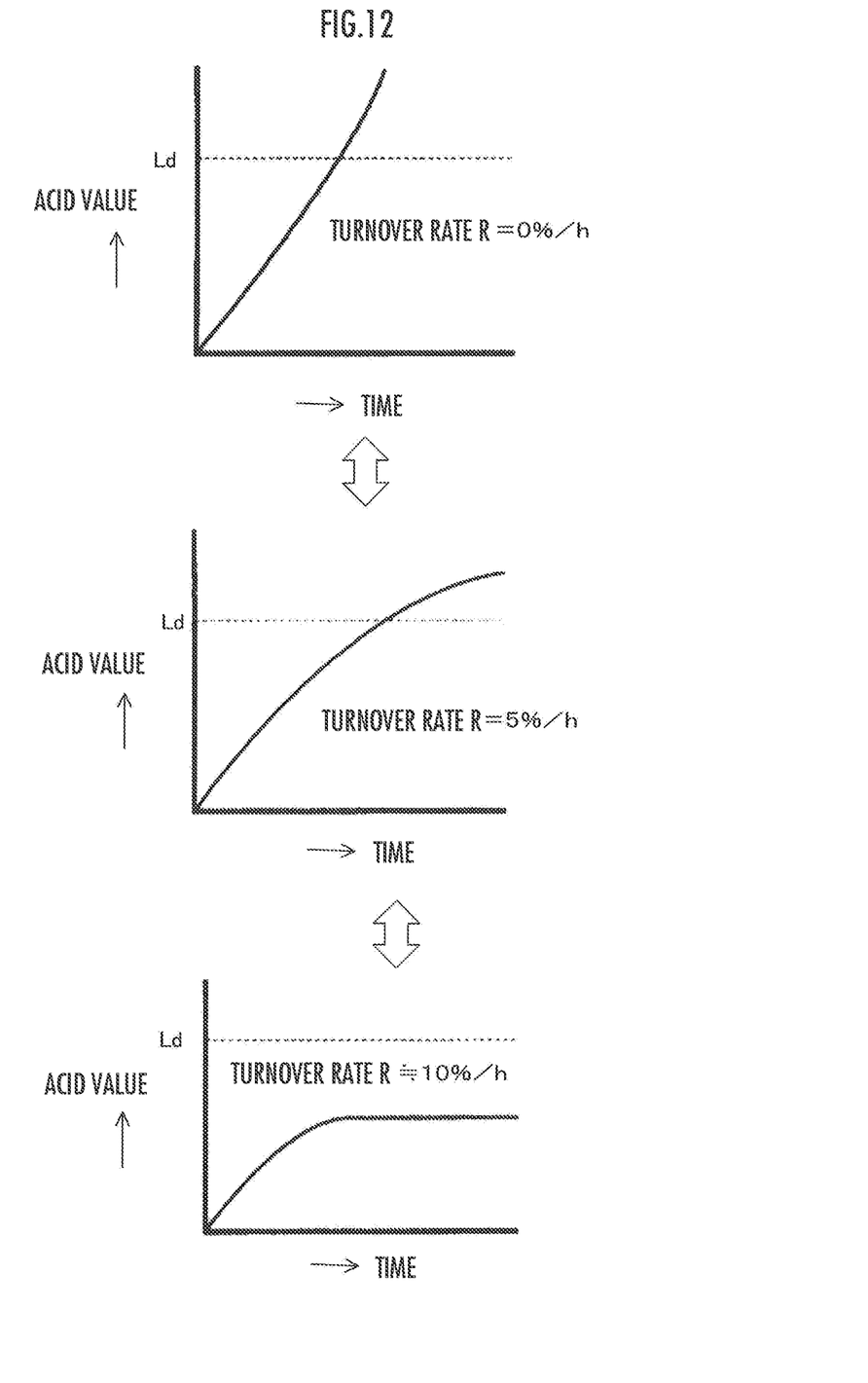
FIG. 12 is a graph of how the relationship between the acid value and the usage time of the frying oil in the oil tank changes with an oil addition turnover rate R.

FIG. 12 is a graph of how the relationship between the acid value and the usage time of the frying oil 17 in the oil tank 15 changes with a turnover rate R of for adding oil. The turnover rate R is defined by the following equation (1).

$$R(\%/h) = \{\text{total amount (L) of added oil within set time}\}/\text{amount (L) of oil filled} \div \text{set time (h)} \times 100\% \quad (1)$$

The amount of oil filled in equation (1) is the volume of the oil tank 15. For example, when the amount of oil filled is 20 L, the set time is 8 hours, and the total amount of added oil within the 8 hours is 10 L, the turnover rate R is calculated from equation (1) as follows.

$$R(\%/h) = \{10 \text{ (L)}/20 \text{ (L)} \div 8 \text{ (h)}\} \times 100\% = 6.25\% \quad (2)$$

The total amount of waste oil is 10 L. Adding oil in equation (1) involves discarding old frying oil 17 in the same amount as the amount added with each addition of new frying oil 17.

If 10% of the amount of oil filled is discarded every day in order to add oil, the amount of waste oil in one month (=30 days) will add up to 300%. In addition, if the total amount (100%) is discarded once every 5 days, the amount of waste oil in one month will be 600%.

From FIG. 12, as the turnover rate R increases, the acid value of the frying oil 17 in the oil tank 15 can be kept commensurately lower. However, the amount of waste oil (amount of frying oil 17 purchased) also commensurately increases as the turnover rate R increases. In addition, when the acid value reaches a waste oil level Ld, it is necessary to replace the entire amount of the frying oil 17 in the oil tank 15 with new frying oil 17. Cleaning of the oil tank 15 is difficult except when the entire amount of frying oil 17 is replaced. When the turnover rate R is approximately 10%/h, the acid value does not reach the waste oil level Ld and it is therefore not necessary to replace the entire amount of frying oil 17, but it is better to replace the entire amount regularly to clean the oil tank 15.

Therefore, for example, at first oil is added at a turnover rate R of approximately 10%/h, and when it will soon be necessary to clean the oil tank 15 or when the day of performing the work of cleaning the oil tank 15 is approaching, it is efficient to have the turnover rate R be approximately 5 or 0%/h. In addition, it is effective to add oil at a turnover rate R of approximately 10%/h during a busy season when the fried food 19 sells well, and to have the turnover rate R be approximately 5 or 0%/h during an off-season.

An example of the specific content of the report in STEP 108 relating to the new oil addition process is "Discard (take out) _____ % (_____ kg) of the oil from the oil tank 15 and add _____ kg of new frying oil 17," etc. This can lead to a reduction in the amount of frying oil 17 used (prolonging the life of the oil) and a reduction in the amount of waste oil while suppressing the progress of the degree of deterioration of the frying oil 17 in the electric fryer 14.

(Modification)

The fryer of the present invention may be any fryer as long as it is a cooking container that fries fried food in frying oil. An electric fryer 14 is used in the embodiment, but a fryer, pan, etc., heated by gas can also be used as the fryer of the present invention.

In the electric fryer 14 of the embodiment, the operation unit is a button type, but may be, for example, a dial type in which a rotation position is set for each dial, or a lever type in which each lever is disposed differently.

FIGS. 4A-4C illustrating the embodiment show the three characteristics of acid value, viscosity, and color as examples of deterioration indicators that affect frying oil deterioration. These examples are not provided by way of limitation as to the deterioration indicators of the present invention; any other deterioration indicators that affect the frying oil deterioration can be selected. Other deterioration indicators include, for example, the viscosity increase rate, the anisidine value, and the amount of polar compound. One, two, or more deterioration indicators from a plurality are included in the deterioration indicators used as indicators for assessing the degree of deterioration of the frying oil.

In the embodiment, the recording unit 45 records the types of fried foods 19 fried in the frying oil 17 and the fried quantities of each type on the basis of the output image of the camera 29 photographing the inside of the electric fryer 14, or on the basis of which button switches 23 serving as which operation unit have been operated when the cook sets the frying basket 21 in the electric fryer 14.

However, the types and fried quantities can also be detected from a sales record (hPOS) of the fried foods 19, which is transmitted to the headquarters 37 from the shop 32 where the electric fryer 14 is installed. The sales record can include POS information and information on a cooking work record kept by the cook. Furthermore, the cooking work record or another record kept by the cook or other staff may be handwritten.

In the example of FIG. 1, the display 25, based on the assessment result of the assessment unit 47, displays the words "Replace frying oil." In the present invention, the assessment unit 47 and/or the determination unit 48 can display desired messages on the display 25.

For example, examples of messages displayed on the display 25, based on the determination result of the determination unit 48, include "more pieces may be fried" and "It is time to order frying oil." In addition, information pertaining to the management and cooking of frying oil can be displayed on the display 25 as appropriate and in various ways.

Furthermore, the words "Replace the frying oil" displayed on the display 25 by the assessment unit 47 can be displayed continuously until a shopworker replaces the frying oil, instead of ceasing to be displayed after a predetermined time has elapsed. Control can also be performed such that after another predetermined time has elapsed following the display of the words "Replace the frying oil" on the display 25, use of the electric fryer 14 is forcibly stopped when the frying oil is replaced.

In the embodiment, the frying oil deterioration assessment device 41 is installed as computer software in the management server 40 of the headquarters 37. The frying oil deterioration assessment device of the present invention may be installed in information processing equipment (not shown) set up in the shop 32, separated from the management server 40 of the headquarters 37, and operated independently.

In the embodiment, inter alia, for example, the regression equation of equation (1) is used when the replacement period (waste oil point) is determined, and the characteristic graphs of FIGS. 4A-4C, which are obtained from tests, experiments, or rules of experience, are used when the correlation between the degree of deterioration for each type of fried food 19 and the values of the deterioration indicators. The regression of the regression equation used when determining the exchange period may be either simple regression or multiple regression. In addition, such regression equations and characteristics can be searched by artificial intelligence (AI), machine learning, a support vector machine (SVM), bugging, boosting, adaptive boosting, a decision tree, a random forest, logistic regression, a neural network, deep learning, and within deep learning, a convolutional neural network (CNN or a recurrent neural network (RNN)), a long short-term memory (LSTM), etc. The search results can be used as regression equations and characteristics.

KEY TO SYMBOLS

14: Electric fryer (fryer)
17: Frying oil

19: Fried food
29: Camera
41: Frying oil deterioration assessment device
42: Database
45: Recording unit
46: Holding unit
47: Assessment unit
48: Determination unit
49: Reporting unit

The invention claimed is:

1. A frying oil deterioration assessment device comprising a processor and a memory having program code stored therein for execution by the processor,
wherein the processor executes the computer program code to:
record types of fried foods fried in frying oil in a fryer and fried quantities for each type;
hold correlation data indicating a relationship between fried quantity and degree of deterioration of frying oil for each type of fried food; and
assess the degree of deterioration, which is the extent of deterioration of the frying oil in the fryer, based on the held correlation data and the recorded fried food types and fried quantities for each type,
for each type of fried food, the correlation data includes deterioration-indicator-specific data indicating a relationship between a value of a deterioration indicator and the fried quantity with each of one or more deterioration indicators of the frying oil; and
the processor further executes the computer program code to evaluate the value of the deterioration indicator pertaining to the frying oil in the fryer based on the deterioration-indicator-specific data, and assesses the degree of deterioration of the frying oil based on the evaluated value.

2. The device according to claim 1, wherein the degree of deterioration of the frying oil is a predetermined degree of deterioration when the value of any one of the evaluated deterioration indicators of the frying oil in the fryer has exceeded a predetermined threshold value.

3. The device according to claim 1, wherein the deterioration indicators include at least one of the following, for frying oil: acid value, viscosity, viscosity increase rate, color, anisidine value, polar compound amount, iodine value, oil temperature at the time of smoke emission, volatile component amount, volatile component composition, and flavor; and for the fried food fried in the frying oil: volatile component amount and flavor.

4. The device according to claim 1, wherein the processor further executes the computer program code to, based on the assessed degree of deterioration of the frying oil in the fryer, determine the type of fried foods allowed to be fried in the frying oil and the fried quantity for each type, or a discard amount and an add amount in a new oil addition process in which new oil is added into the fryer while discarding some or none of the remaining frying oil in the fryer.

5. The device according to claim 4, wherein the processor further executes the computer program code to report a result of the determined determination and a timing to carry out the new oil addition process, said timing being based on the result of determined determination.

6. The device according to claim 1, wherein the processor further executes the computer program code to report a result of the assessed assessment.

7. The device according to claim 1, wherein the processor further executes the computer program code to recognize and record the types of fried foods fried in the frying oil and the fried quantity for each type based on at least one of the following: an image outputted from a camera that photographs the inside of the fryer, an operation performed on an operation unit of the fryer, a sales record of the fried foods fried in the frying oil, and a cooking work record of the cook.

8. The device according to claim 1, further comprising a detector configured to detect the types of fried foods fried in the frying oil in the fryer and the fried quantities for each type.

9. The device according to claim 8, wherein the detector includes at least one of a camera or POS.

10. The device according to claim 1, further comprising a storage device configured to hold the correlation data indicating the relationship between the fried quantity and the degree of deterioration of the frying oil for each type of fried food.

11. The device according to claim 10, wherein the storage device includes database.

12. A frying oil deterioration assessment method characterized by comprising:
a recording step in which a recording unit records types of fried foods fried in frying oil in a fryer and a fried quantity for each type; and
an assessment step in which an assessment unit assesses a degree of deterioration, which is an extent of deterioration of the frying oil in the fryer, on the basis of the recorded types of fried foods and the fried quantity of each type, and correlation data indicating a relationship between the fried quantity and the degree of deterioration of the frying oil for each type of fried food,
wherein for each type of fried food, the correlation data includes deterioration-indicator-specific data indicating a relationship between a value of a deterioration indicator and the fried quantity with each of one or more deterioration indicators of the frying oil; and
the frying oil deterioration assessment method further comprises evaluating the value of the deterioration indicator pertaining to the frying oil in the fryer based on the deterioration-indicator-specific data, and assessing the degree of deterioration of the frying oil based on the evaluated value.

* * * * *